Patented Aug. 30, 1932

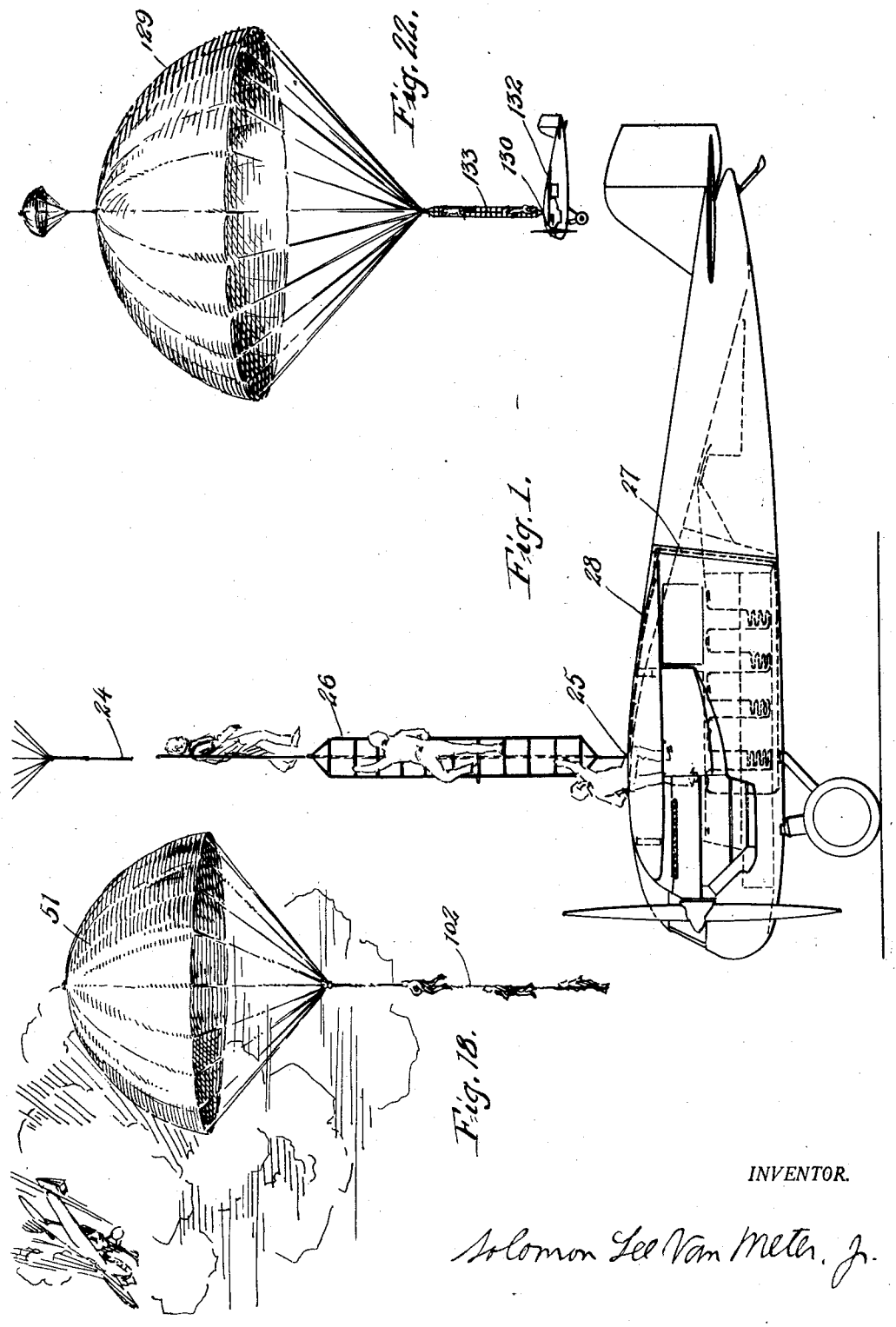

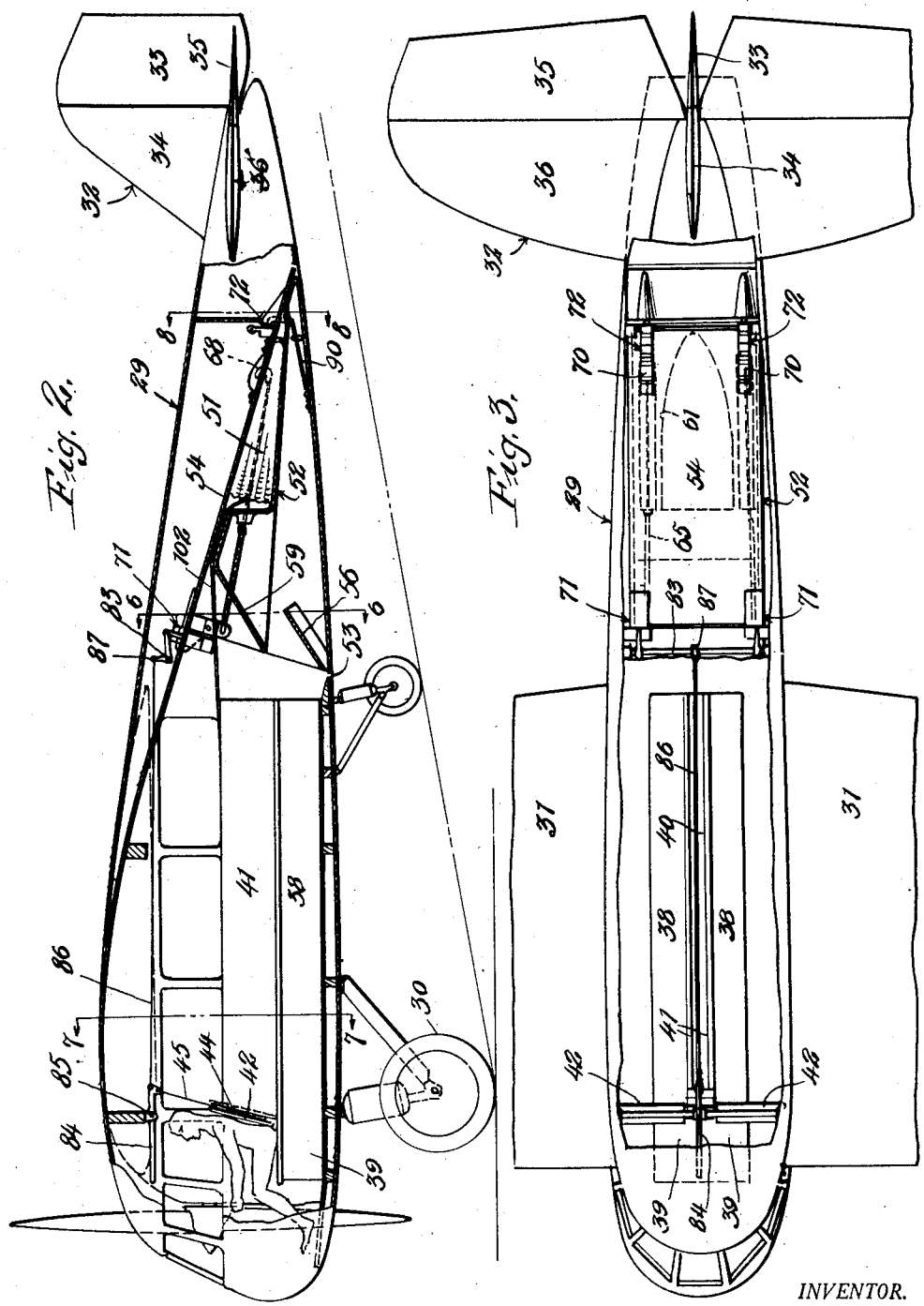

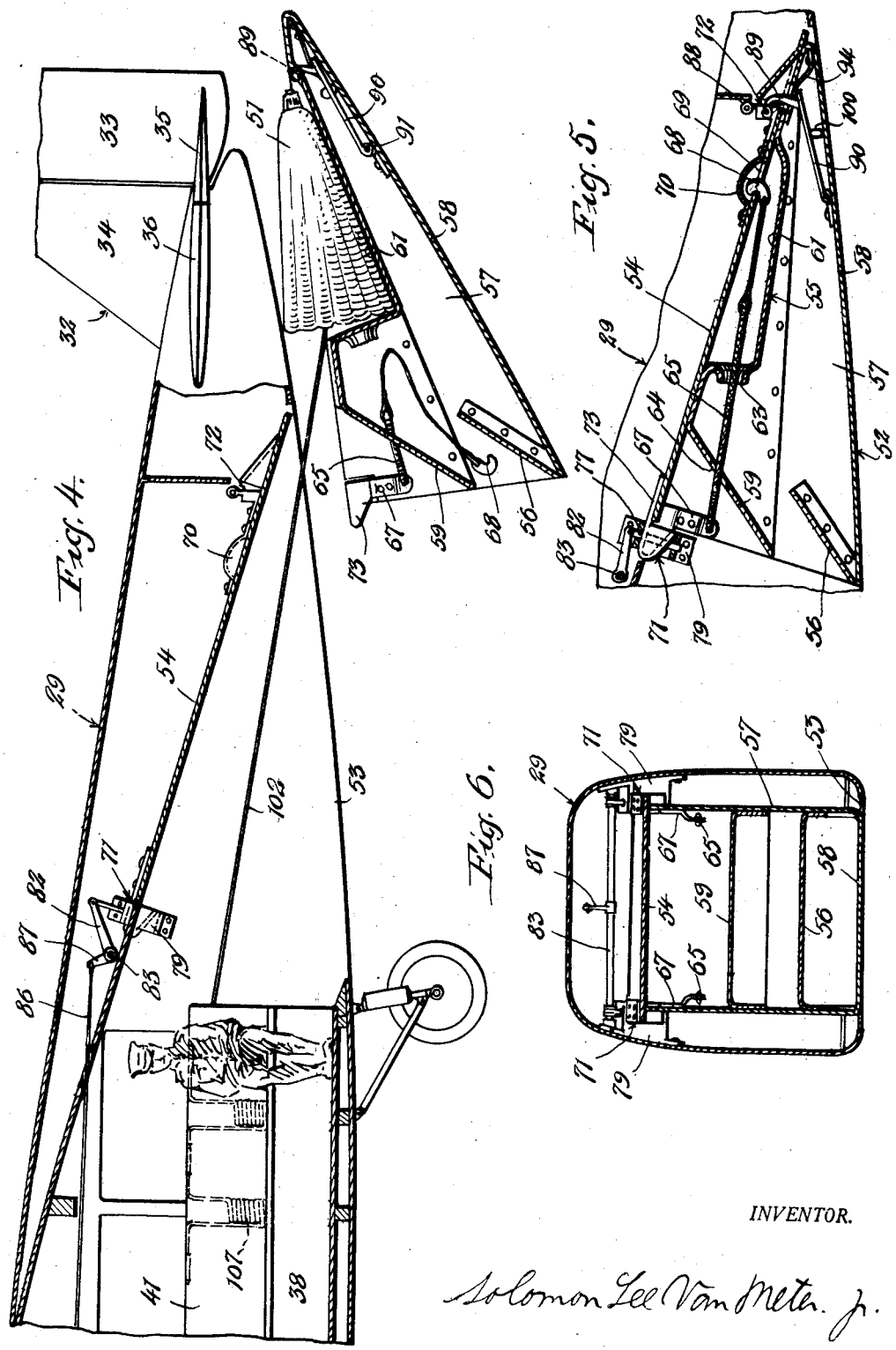

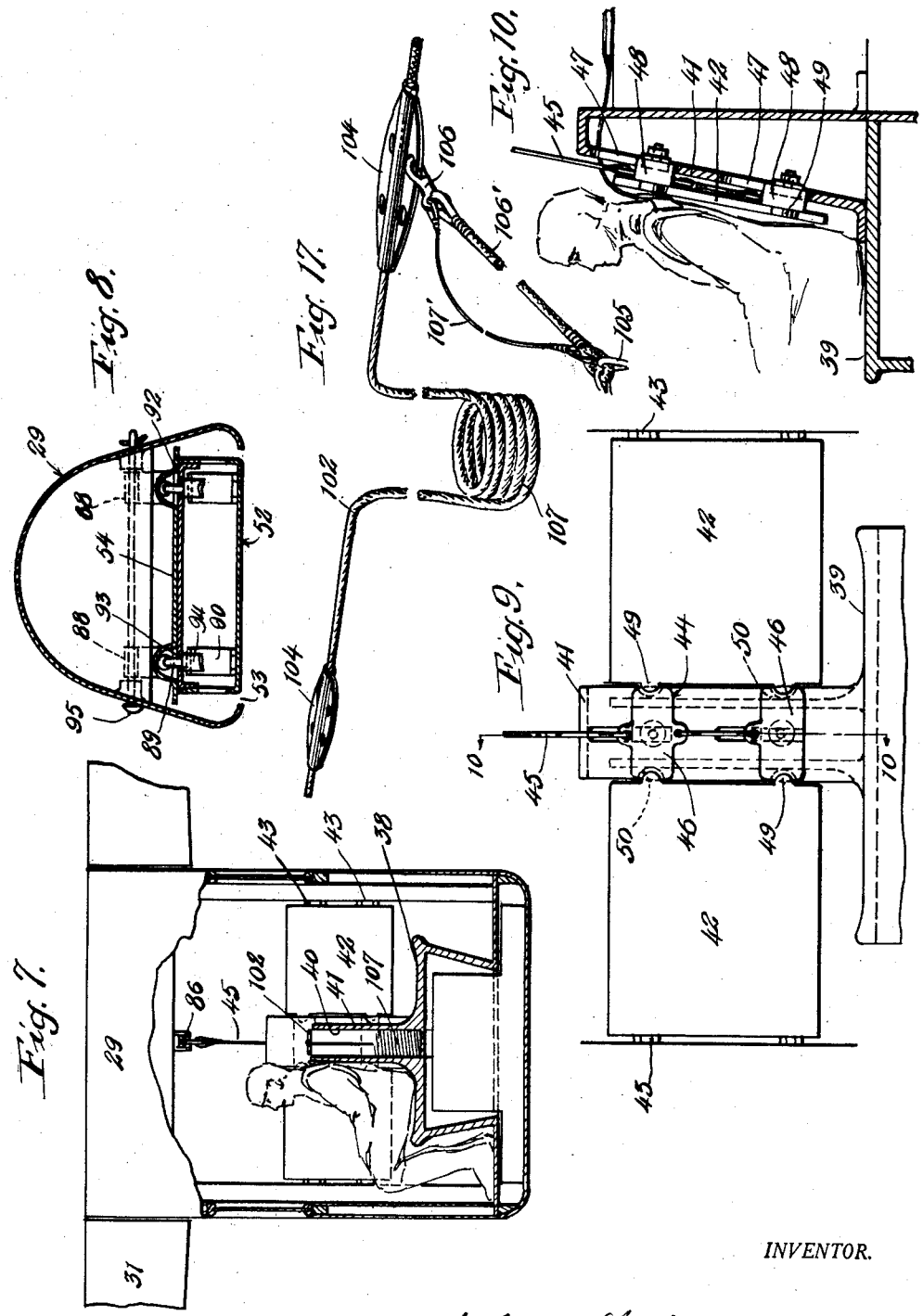

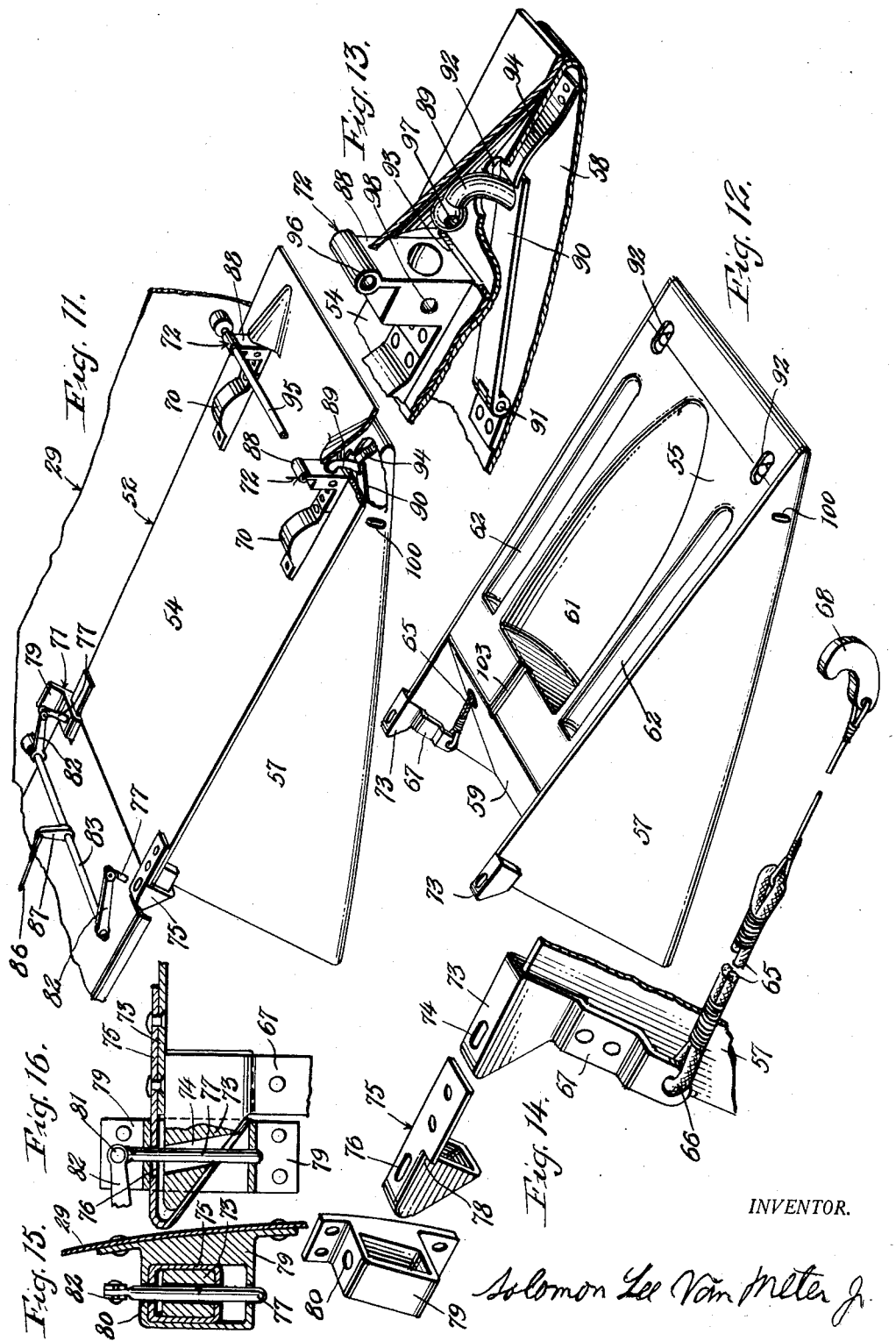

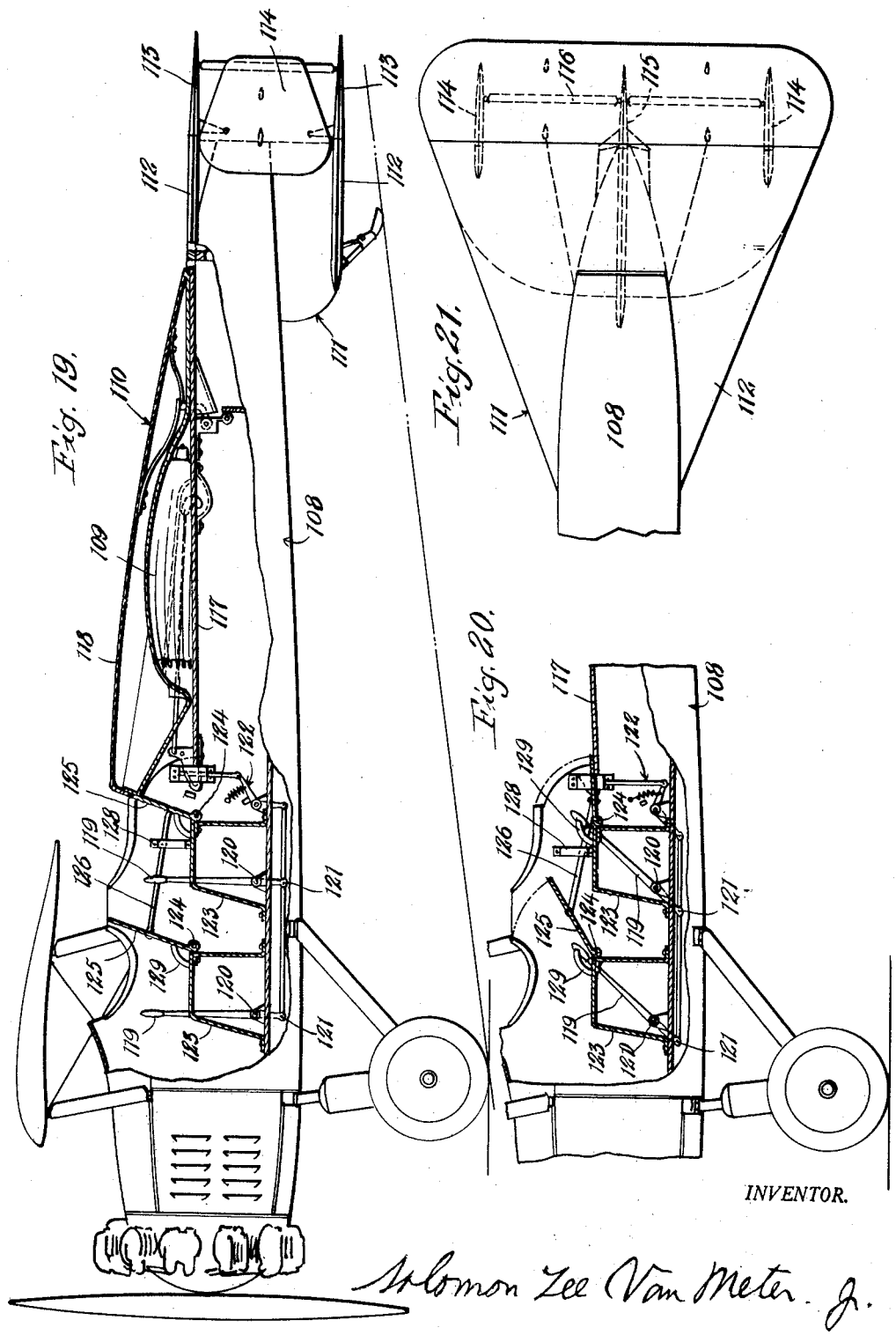

1,874,392

UNITED STATES PATENT OFFICE

SOLOMON L. VAN METER, JR., OF HEMPSTEAD, NEW YORK

PARACHUTE

Application filed March 21, 1928. Serial No. 263,561.

My invention relates to aircraft and more particularly to an arrangement whereby, in an emergency, either the machine itself, indepently of its occupant or occupants; or the occupant or occupants, independently of the machine; or the machine itself along with its occupant or occupants, may be safely landed by means of a parachute.

One object of my invention is to improve devices such as those disclosed in my former United States Patents No. 1,192,479, issued July 25, 1916, No. 1,192,480, issued July 25, 1916, and No. 1,386,815, issued August 9, 1921.

In the use of the seat-pack or back-pack type parachute (and this is stressed because of the adoption of this type parachute as the standard of equipment) approximately six to eight seconds are lost in unfastening the safety belt in climbing out of and jumping clear of the machine, in pulling the rip cord, and in waiting about two seconds thereafter for the parachute to open. An analysis of a large number of aeroplane accidents occurring during the last ten years shows conclusively that in about three out of four such accidents the life of the flyer might have been saved were it possible to reduce the time interval between the decision to abandon the craft and the full opening of the parachute. This is particularly true where the accident occurs or where the decision to abandon the craft is made at a comparatively low altitude.

Speed of operation, plus reliability, therefore, is the crux of the present invention. Instead of a time interval of approximately six to eight seconds between the decision to abandon the craft and the full opening of the parachute, only two seconds, approximately, are required where the present invention is employed. This seeming insignificant saving of anywhere from four to six seconds is in many instances the difference between life and death. The parachute arrangement herein disclosed requires for its successful operation but one conscious act on the part of the endangered flyer; the tripping of a release lever. No groping around to release the safety belt, no climbing out of and jumping clear of the machine, no pulling of a rip cord, and no waiting of approximately two or more seconds for the parachute to open is required. From the moment the parachute release mechanism is tripped, all further operation is instantaneous and automatic. Immediately the parachute is released it is expelled or ejected clear of the machine to open automatically. When open, the occupant or occupants of the machine, whether conscious or unconscious, are dragged or pulled therefrom by the drag force of the parachute and safely landed. But two seconds, approximately, will have elapsed between the release of the parachute and the beginning of the safe descent of the occupant or occupants harnessed to the load line thereof. The operation, in every instance, is unfailing.

Other and further characteristics of the invention will be hereinafter set forth.

In the drawings, wherein like reference characters denote like or corresponding parts.

Fig. 1 is a side elevation of an aeroplane of more or less conventional appearance; the parachute arrangement thereof being such that the machine itself along with its occupant or occupants may be safely landed in an emergency;

Fig. 2 is a longitudinal sectional view of an aeroplane in which a parachute arrangement is disclosed similar to that indicated in Fig. 1, except that in Fig. 2 no provision is made for landing the machine itself along with its occupant or occupants;

Fig. 3 is a plan view of an aeroplane of the character illustrated in Fig. 2;

Fig. 4 is an enlarged view, similar to Fig. 2, the parachute and its container being shown released and ejected;

Fig. 5 is a longitudinal vertical sectional view of the parachute container showing the manner in which it is releasably fastened within the machine;

Fig. 6 is a section on the line 6—6 of Fig. 2;
Fig. 7 is a section on the line 7—7 of Fig. 2;
Fig. 8 is a section on the line 8—8 of Fig. 2;
Fig. 9 is a detail elevation of the seat-back release mechanism;
Fig. 10 is a section on the line 10—10 of Fig. 9;
Fig. 11 is a detailed perspective view of the parachute container with the top or cover plate in place;

Fig. 12 is a similar view showing the cover plate removed;

Fig. 13 is a detailed perspective view of the rear end fastening for the shedable portion of the container;

Fig. 14 is a similar view illustrating the forward end fastening;

Figs. 15 and 16 are fragmentary sectional views of said forward end fastening;

Fig. 17 is a perspective view of a portion of the load line showing the attachment plates thereon;

Fig. 18 is a perspective view of an open parachute of the type used in connection with Figs. 2 to 14, inclusive, showing the occupants of the machine strung along the load line thereof;

Fig. 19 is a view similar to Fig. 2 showing a somewhat different installation;

Fig. 20 is a fragmentary sectional view of a portion of the structure illustrated in Fig. 16 showing the position of certain parts thereof when the parachute is released;

Fig. 21 is a plan view of a preferred form of empennage for that type machine illustrated in Fig. 16, and Fig. 22 is a view similar to Fig. 18 showing a further modification.

Referring first to Fig. 1 of the drawings, wherein one embodiment of the invention is illustrated, an arrangement is disclosed whereby the passenger or passengers are dragged, as it were, from the machine when the parachute is released; the passengers, once clear of the machine, being strung along the parachute load line as indicated. The parachute used in this arrangement of the invention may be of any suitable type. Its load line 24 is fastened as at 25 to the machine at or near a point substantially directly over the center of gravity thereof. At or near its point of attachment to the machine, it (the load line) is provided with a ladder structure 26 throughout a substantial portion of its length. Up this ladder structure the pilot or pilots, as distinguished from the passenger or passengers, are adapted to climb clear of the machine when the parachute is fully open. The passenger or passengers are harnessed to the load line at all times. When the parachute is released it is ejected clear of the bottom of the craft to automatically open. Once open, the passengers are dragged, either one or two at a time, out of the machine by the drag force of the parachute and the load line which is normally confined in a groove 27 along one side of the body of the machine, is ripped loose until finally the load line assumes that position indicated in Fig. 1. The ladder structure 26 occupies, when folded, space 28 along the top of the body and is the last part or portion of the load line to be ripped loose.

When the ladder structure 26 shall have assumed the position indicated in Fig. 1, the occupant or occupants of the machine (except the pilot or pilots) will have been dragged therefrom. The pilot or pilots may then climb the ladder structure to land with safety along with the machine and its passengers. A suitably proportioned parachute should be used. It may also be pointed out that in landing, the weight of the machine itself, once removed from the load line, the occupants of the craft will thereupon settle slowly to the ground. As the detailed structure of the parachute release mechanism etc. is substantially identical with that illustrated in Figs. 2 to 18, inclusive, that description of such mechanism given hereinafter wherein said figures are specifically referred to, will suffice.

In the embodiment of the invention illustrated in Figs. 2 to 18, inclusive, no provision is made for the safe landing of the machine itself. In this embodiment of the invention the occupant or occupants of the machine are all fastened to the load line of the parachute and the machine itself when the occupant or occupants are dragged therefrom is abandoned. In Figs. 2 and 3 an aeroplane equipped with this form of parachute arrangement is illustrated. Such aeroplane, in addition to the fuselage or body 29 thereof, comprises a landing gear 30, wings or supporting surfaces 31, a power plant (not shown) and an empennage 32, the latter including the usual vertical rudder 33, vertical stabilizer 34, elevators 35 and horizontal stabilizer 36. The empennage parts, in view of the fact that the parachute when released, is shed clear of the fuselage from its underside, may be grouped as a unit, in the customary manner, substantially above and at the tail end of the machine. Thus arranged, no interference between the empennage and the parachute, when released, can possibly occur.

On the inside of the fuselage or body 29, seats 38—38 and 39—39 for the passenger or passengers and for the pilot or pilots respectively, are provided. The seats 38 instead of extending crosswise the fuselage, are arranged back to back lengthwise the machine with a long narrow open space 40 between them. The seats 39, however, in effect at least, extend crosswise the body, altho each (see Fig. 2) is in reality a forward continuation of one or the other of the seats 38. Thus arranged, an unbroken guideway extending lengthwise the cabin, is provided.

Each seat 38 is provided with an immovable seat-back or back-rest 41, whereas each seat 39 is provided with a swinging seat-back 42. It is between the seat-backs 41 that the space 40 above mentioned is formed. The seat-backs 42 are spring-hinged as at 43, one at each side of and within the body to extend inwardly as indicated in Fig. 7. Thus extended the seat-backs 42 overhang the seats 39 and are held so extended by suitable back-rest release mechanism designated in its entirety as 44. So long as said release mechanism remains untripped, the seat-backs 42 constitute a partition between that portion of the cabin space allotted to the passengers and that portion allotted to the pilots.

In Figs. 9 and 10, the construction of the back-rest release mechanism 44 is clearly illustrated. It comprises, in addition to an operating cable 45, two trip-plates 46 arranged to slide substantially vertically along the forward end of the fixed or immovable seat-backs 41. Said seat-back end may or may not be inclined to the vertical. As indicated in Fig. 10 it is provided with slots 47, one for each plate, thru which lugs 48, fastened to the plates 46, extend. These lugs, by their engagement in said slots 47, guide the trip-plates when actuated or tripped by the operating cable 45. Normally the trip plates 46 are so positioned with respect to the seat-backs 42 as to engage therewith and prevent the backward swinging movement thereof until such time as the cable 45 is pulled. Ears 49, formed on the inner edges of the seat-backs 42, provide for this engagement. Where the width of the seat-back end (as herein shown) is such as to prevent the free backward swinging movement of the seat-backs (when released), notches 50 may be formed therein for the unobstructed passage of the projecting ears 49. Each seat-back 42, when released, under the urge of the spring hinges 43, is adapted to lie substantially flat against one side wall of the cabin. The cabin, with the seat-backs thus positioned, is unobstructed from end to end.

The parachute, by means of which the occupant or occupants of the machine are pulled therefrom and safely landed, may be of any well known construction. In Fig. 2 a conventional type parachute 51 is shown collapsed and folded. Under normal flight conditions the parachute 51 is housed in a suitable container 52 releasably fastened on the underside of the body. This container 52 is preferably of substantially tri-angular shape in longitudinal section, and is adapted to fit, blunt end foremost, within a body opening 53. Said opening, it will be noted, occupies a position immediately behind the cabin space and in such relation to it as to admit of the passage thru said opening of the occupants of the cabin, one (or one pair) after another, once the parachute is open.

To the end that the occupant or occupants of the body may be guided thru the opening 53, the top inside wall thereof is preferably inclined downwardly and rearwardly from a point within the cabin to the rear end of said opening. A portion of this wall, i. e., that portion directly over said opening, constitutes a non-shedable though mechanically movable portion of the container 52. The container, in addition to said non-shedable part 54, hereinafter referred to as a top plate, comprises a false top 55, a backwardly inclined forward baffle 56, side walls 57—57, and a bottom wall 58. All of said parts, except the top plate 54, are shedable as a unit clear of the machine when the parachute container is released. With the parachute folded and in place the side walls of the container engage between the side walls of the body and the bottom 58 thereof completely fills the body opening 53. The container, therefore, under normal conditions offers no resistance whatsoever.

The false top 55 of the container is best illustrated in Fig. 12. At its forward end it is upwardly and rearwardly inclined as at 59 to provide, together with the baffle 56, flat surfaces against which the air impinges to separate the parachute and container when the latter is ejected. At the upper end of said inclined forward portion 59, the false top 55 is carried rearwardly as at 60 for bearing engagement beneath the top plate 54 to which the shedable portion of the container is releasably fastened at its opposite ends. Said portion 60 of the false top 55 has formed therein a relatively deep depression 61 and at each side of said relatively deep depression 61, a comparatively shallow depression 62, the depressions, in each instance, being deeper at their forward ends than toward the rear. Within the deep depression 61, the parachute in its folded condition is confined. At the forward end of each shallow depression 62 an opening 63 is formed. Similar openings 64, in line with the opening 63, are formed in the inclined surface 59 of the container. These openings 63 and 64, arranged in pairs, one pair at each side of the container, like the shallow depression 62, are adapted to receive within them two elastics 65. At one end, said elastics are fastened, as by eyes 66, to fittings 67 attached to the side walls 57 of the container at or near its forward end. Together, the elastics 65 provide an ejecting means for throwing or forcibly expelling the container backwardly and away from the fuselage when it (the container) is released. In assembling or conditioning the elastics to thus forcibly eject the container, both elastics are stretched rearwardly and fastened as by hooks 68 to the top plate 54; openings 69 being formed in said plate near its rear edge, for this purpose. If desired, caps 70 may be fastened over said openings 69 to prevent the hooks 68 from extending too far thereinto.

The means for releasably fastening the container 52 against the top plate 54 comprises two retaining devices 71—71 at the forward end of said container and two retaining devices 72—72 at the rear end thereof. The retaining devices 71—71 are identical in construction and operation. Each includes a latch bar 73 having a vertical slot 74 formed therein, and a keeper 75 similarly slotted as at 76. The latch bar 73 is preferably formed as an integral part of the fitting 67 and is adapted to engage in the keeper 75 where it is releasably held by a lock-pin 77 extending vertically thru the then aligned slots 74 and 76 of the bar and keeper respectively. The keeper 75 is fastened to the top plate 54 and has formed at one side thereof a shoulder 78 which engages a master-keeper 79 fastened to and against the inside wall of the fuselage or body. This master-keeper 79 is adapted to receive the keeper 75 and is provided also with a vertical opening 80 thru which the lock-pin 77 is passed. The lock-pin, therefore, not only releasably fastens the shedable portion of the container 52 to the top plate 54 but it also acts as a fastening means for holding the top plate within the body. By vertically raising the lock-pin 77 until it is entirely clear of the latch bar 73 the complete release of the shedable portion of the container 52 is effected. As the devices 71—71 are intended to be operated simultaneously, each lock-pin 77 (there being one for each device 71) is fastened as at 81 to one or the other of two arms 82 mounted on a rotatable shaft 83 extending cross-wise the body.

A release lever 84, positioned in convenient proximity to one or the other or both of the seats 39—39, and pivoted as at 85, is operable to rotate said shaft 83, and simultaneously therewith actuate the seat-back release mechanism 44. This lever 84 has fastened to it the operating cable 45. It also has fastened thereto a second operating cable 86. Said latter cable 86, unlike the cable 45, however, extends rearwardly along and adjacent to the top of the body, and is fastened at its opposite end to an arm 87 mounted on and extending off from the shaft 83 at substantially a 90 degree angle to the arms 82 by means of which the lock-pins 77 are actuated. An operating lever, common to both the seat-back release mechanism 44 and to the devices 71—71, is thus provided.

The devices 72—72, unlike the devices 71—71, operate automatically. Such automatic operation is in direct response to the urge of the stretched elastics 65. Like said devices 71—71, however, each device 72 is identical in construction and operation. They are positioned, one device at each side of the container, near its rear end. As illustrated in Fig. 13, each device 72 includes an upstanding socket fitting 88 fastened against the top face of the top plate 54, and a ball and fitting 89 mounted at the outer end of a movable plate 90 hinged as at 91 to the bottom wall 58 of the container. Said ball end fitting 89 projects upwardly thru an opening 92 formed in the false top 55 of the container as well as upwardly thru an opening 93 formed in the top plate 54. At its upper end it (the ball end fitting) is carried forwardly as indicated to enter, from the rear, the socket of the fitting 88 and is thus releasably held against movement in other than a backward direction by said fitting. Thus arranged, the elastics 65, the moment the container 52 is released, will act to withdraw the ball end fitting from its engagement in the socket fitting 88.

The ball end fitting 89, when clear of the socket fitting 88, is immediately withdrawn from its position within the openings 92 and 93 by a leaf spring 94 bearing on the outer end of the plate 90. As a means for removably fastening the top plate 55, at its rear end, to and within the fuselage or body, a laterally removable pin 95, extending cross-wise the fuselage and engaging in openings 96 formed in the socket fittings 88, is provided. Together with the master-keepers 79 at the forward end of the container, the pin 95 constitutes a lock-means whereby the container, with the parachute packed therein, is adapted to be removably held in position within the craft. When it is desired to remove the container as a unit, the pin 95 is withdrawn, the lock-pins 77 raised, and the container dropped thru the body opening within which it is adapted to engage. To hold the bottom portion of the container in place during such unit removal, such pin 95 may be inserted to engage in openings 97 and 98 formed in the ball end fittings 89 and socket fittings 88 respectively. Moreover, during assembly, to raise the ball end fittings 89, a rod or other tool can be inserted beneath the plates 90 thru an opening 100 formed in one side wall 57 of the container. Such an arrangement or construction is advantageous in that the parachute may be packed and stored, ready for use, within a container, and the container bodily installed in an aeroplane when it is desired that a flight shall be made.

Either the main parachute or pilot parachute is preferably of the spring opening type. Its load line 102, from the parachute end, extends rearwardly from the parachute and forwardly of the airplane along a groove 103 formed in the false top of the container and thence forwardly into the cabin space between the seats provided therein. At intervals of space along such portion of its length it (the load line) is provided with attachment plates 104 to which the harness 105 for the occupants of the craft are clipped as at 106, suitable elastic connections 106' (see Fig. 17) being provided for this purpose. Between the occupants and within the space 40 between the seats 38—38 the load line is coiled as at 107 so that the occupants in being dragged from the cabin, when the parachute is open, will be dragged either one or two at a time and in definite timed relation; the pilots, seated at the forward end of the cabin, being the last to leave the machine. As a safety precaution and at the same time, as a means limiting the extent to which the elastic connections 106' can be stretched, inelastic connections 107' may be used.

Referring next to that embodiment of the invention illustrated in Figs. 19 to 21, inclusive, 108 designates an aeroplane fuselage of a somewhat different design. In this embodiment of the invention the occupants of the craft are dragged from the cockpit space over the rear top wall of the fuselage. The parachute, designated as 109, instead of being mounted beneath the fuselage is mounted in a container 110 constituting a turtle-back for the fuselage position directly behind the cockpit opening. To prevent said parachute from fouling the empennage, when released, the empennage, designated in its entirety as 111, differs from the conventional in that no portion thereof is carried above the horizontal plane of the top of the fuselage or body. It includes (see Figs. 19 and 21) two horizontal stabilizers 112—112, two elevators 113—113 and three rudders 114—114 and 115, the latter or rudder 115 being mounted at the tail end of the fuselage in rearward continuation thereof. Said rudder surfaces are interconnected as at 116 to move in unison.

As in the previously described embodiment of the invention the parachute container 110 includes a non-shedable part 117 removably fastened to the fuselage or body, and a shedable part 118 releasably fastened to said non-shedable part. The releasable part is fastened to said non-shedable part in much the same manner as previously described except that the attachment fittings or other retaining elements are inverted. Release levers 119 pivoted as at 120, and connected as at 121 to suitable operating mechanism 122, are adapted to control the release of the shedable part of the container. Such levers 119 are positioned one each in convenient proximity to the seats 123, of which there are two, arranged in tandem within the cockpit space of the fuselage. Said seats 123 have hinged thereto as at 124 suitable seat-backs 125 which are adapted, when the parachute is released, to swing backwardly from their normal substantially vertical position to a position extending at substantially a right-angle thereto, the different positions assumed by the seat-backs, both before and after the parachute release, being indicated in Figs. 19 and 20 respectively. To hold the forward seat-back 125 out of engagement with the rear seat 123, when the parachute is released, a link 126 extends off therefrom at one side thereof, which link, at its opposite end, is fastened to the rear seat-back 125. A clip 128 under which the arm 126 passes, guides said arm in its movement. The rear seat-back 125 is normally held substantially upright by its engagement with the parachute container. When said container is released, said rear seat-back is adapted to swing backwardly to a substantially horizontally flat position so as not to interfere with the backward movement of the occupant or occupants of the machine when dragged therefrom rearwardly by the open parachute. In other respects the structure illustrated in Figs. 19 to 21, inclusive, is substantially the same as that described in the first instance, except that each seat 123 at one side thereof, is provided with an arcuate fastening 129 for the attachment of the safety-belt ends. When the seat-backs swing rearwardly the ends of these fastenings are uncovered to provide for the automatic release of the safety-belt ends by slippage therefrom.

As the invention also contemplates the emergency landing of the aeroplane itself under the restraining influence of a suitably proportioned parachute, without dragging the passengers therefrom, I have indicated in Fig. 22 still another embodiment of the invention. The parachute 129, instead of having a load line to which the occupants of the craft are harnessed, is directly fastened as at 130 to the machine. It is confined in a container 132 adapted to be housed and attached to the fuselage or body in the manner described in connection with Figs. 19 to 21. The load line, throughout a substantial portion of its length, has attached thereto, a ladder structure 133 up which the occupants may climb as the machine falls. Thus organized, one suitably proportioned parachute may be utilized to safely land both the machine and its occupants, an added degree of safety being provided for the occupants thru the use of the ladder structure. Or, if desired, separate parachutes may be provided, one above and the other beneath the fuselage or body, the upper parachute being used to land the machine in safety and the lower parachute used to land its occupants safely. Where this arrangement is used the release mechanisms for the two parachutes should be so inter-related that the release of the upper parachute occurs automatically when and after the lower parachute shall have dragged the occupants from the machine. A breakable cord or other connection extending between the load line of the man-carrying parachute and the release mechanism of the machine-carrying parachute can be provided for this purpose.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications.

What I claim is:

1. In aircraft, the combination, of a body provided with space for the occupants of the craft, a parachute, mechanism under the control of an occupant of the craft for releasing and forcibly ejecting said parachute clear of the craft, and a parachute load-line extending into said body space and to which the occupants are harnessed at intervals of space along the line length, the spacing of said points of harness attachment being such that the occupants are dragged, by the parachute, when open, one after another, from said body space to points without said body.

2. In aircraft, the combination, of a body provided with space for the occupants of the craft, an obstruction extending across said body space, a parachute, mechanism for releasing and forcibly ejecting said parachute clear of the craft, means operable to remove said obstruction substantially simultaneously with the operation of said parachute releasing and ejecting mechanism, and a parachute load-line extending into said body space and to which the occupants are harnessed at intervals of space along the line length, the spacing of said points of harness attachment being such that the occupants are dragged, by the parachute, when open, one after another, from said unobstructed body space to points without said body.

3. In aircraft, the combination, of a body provided with space for the occupants of the craft and with an opening, a parachute, mechanism for releasing and forcibly ejecting said parachute clear of the craft, means operable to remove said obstruction substantially simultaneously with the operation of said parachute releasing and ejecting mechanism, and a parachute load-line extending into said body space and to which the occupants are harnessed at intervals of space along the line length, the spacing of said points of harness attachment being such that the occupants are dragged, by the parachute, when open, one after another, from said unobstructed body space thru said body opening to points without said body.

4. In aircraft, the combination, of a body provided with space for the occupants of the craft, seats for the occupants enclosed within said body space, a seat-back movable from a normal position extending cross-wise said body space to a position extending at substantially a right-angle thereto, a parachute, mechanism for releasing and forcibly ejecting said parachute clear of the craft, means operable to move said seat-back as aforesaid substantially simultaneously with the operation of said parachute releasing and ejecting mechanism, and a parachute load-line extending into said body space and to which the occupants are harnessed at intervals of space along the line length, the spacing of said points of attachment being such that the occupants are dragged, by the parachute, when open, one after another, from said unobstructed body space to points without said body.

5. In aircraft, the combination, of a parachute, mechanism operable to release and forcibly eject the parachute clear of the craft, and a parachute load-line to which the occupants of the craft are harnessed at intervals of space along a substantial portion of the line length.

6. In aircraft, the combination, of a body having formed therein a passage-way along which the occupants thereof are adapted to be dragged, a parachute by means of which the occupants are dragged along said passage-way, a container for said parachute, a portion of said container forming a closure for one end of said passage-way, means for releasing said parachute and along with it that portion of said container normally obstructing said passage-way, and a parachute load line extending into said body and to which the occupants of the craft are harnessed.

7. In aircraft, the combination, of a body having formed within the same a passage-way extending substantially parallel to the line of flight and along which the occupants of the craft are adapted to be dragged clear thereof, a normally packed parachute by means of which the occupants are dragged along said passage-way, a container for said parachute normally obstructing said passage-way, means for releasing said parachute and along with it that portion of said container forming a closure for one end of said passage-way, and a parachute load-line extending into said body and to which the occupants of the craft are harnessed.

8. In aircraft, the combination, of a body having formed within the same a passage-way, a parachute, a container for the parachute engaging in said passage-way, means operable to release said parachute, and clear said passage-way by the forcible ejection of said container, and a parachute load-line to which the occupants of the craft are harnessed and by means of which the occupants are dragged from the craft, along said passage-way, when the parachute is open.

9. In aircraft, the combination, of a body having formed within the same a passage-way, a parachute, a container for said parachute engaging in and normally obstructing said passage-way, means operable to release said parachute and clear said passage-way by the forcible ejection of said container, means for swinging said container, when ejected, clear of the parachute, and a load-line extending off from said parachute.

10. In aircraft, the combination, of a parachute, a container for said parachute, a dual fastening for said container, a release lever operable to disengage one said fastening, an elastic means operable to forcibly eject said container, and along with it the parachute, and at the same time disengage the other said fastening, and a load-line extending off from said parachute.

11. In aircraft, the combination, of a parachute, a two-part container within which the parachute is contained, one part of said container being bodily detachable from the craft, an elastic means operable to forcibly project said one part only of said container away from the craft and along with it the parachute when said container is released, a release means for said container, and a load-line extending off from said parachute.

12. In aircraft, the combination, of a body having formed therein a passage-way, a bodily removable two-part container engaging in said passage-way and forming a closure for one end thereof, means for fastening said container within said passage-way, means operable to release and forcibly eject one said container part to clear said passage-way, a parachute confined within said container and movable with the ejected container part, and a load-line extending off from said parachute.

13. In aircraft, the combination, of a body having a longitudinally extending passage-way formed within the same, a bodily removable parachute container engaging in and forming a closure for one end of said passage-way, means operable to release and eject said container and along with it the parachute to clear said passage-way, and a load-line extending off from said parachute.

14. In aircraft, the combination, of a body, a bodily removable container containing a packed parachute carried by said body, means operable to forcibly eject and shed clear of said body the packed parachute and along with it a portion only of said container, release mechanism operable to release said container, and a load-line extending off from said parachute.

15. In aircraft, the combination, of a body having a passage-way formed within the same, a bodily removable container engaging in and forming a closure for one end of said passage-way, a parachute packed in said container, means operable to forcibly eject and shed clear of said body the packed parachute and along with it that portion of said container normally obstructing said passage-way, release mechanism operable to release said container, and a load-line extending off from said parachute.

16. In aircraft, the combination, of a body having formed a passage-way within the same, a parachute container engaging in said passage-way and comprising a part adapted to be shed clear of the craft and a part removably fastened to the body so as to be non-shedable with said first mentioned part, means operable to forcibly eject the packed parachute and along with it the shedable part of said container to clear said passage-way, said parachute being adapted to be released from the shedable part of said container, and a load-line extending off from said parachute.

17. In aircraft, the combination, of a body, a normally packed parachute operable to open up, when released, to drag from said body when opened up, the occupants thereof, means under the control of an occupant of the craft to release and eject said parachute clear of the craft, a second normally packed parachute operable to open up, when released, and to retard when opened up, the descent of the craft itself, and mechanism operable only after said first mentioned parachute shall have been opened up to release and eject said last mentioned parachute.

18. In aircraft, the combination, of two parachutes, means under the control of an occupant of the craft to release and eject one said parachute, means for releasing and ejecting the other said parachute, and a connection extending between said first mentioned parachute and said last mentioned release means to operate the latter only after said first mentioned parachute shall have been ejected.

19. A container for a parachute for use with an aerial vehicle, said container comprising a lower portion having means comprising a recess for receiving the parachute, an upper portion comprising a top for said first named portion, means for securing the two portions together, means for securing both portions to the body of the aerial vehicle, and means for maintaining the upper portion connected with the aerial vehicle while releasing both the lower portion and the parachute from said aerial vehicle.

20. In safety apparatus for aircraft, a seat for the pilot thereof having a hinged element adapted to serve as a back for said seat, a hook adjacent to said hinged element, a safety belt engaging said hook, and means for moving said hinged element about the hinge from a position in which it forms a closure to prevent the safety belt from leaving said hook and in which it forms a back for the pilot's seat to a position in which the safety belt may freely slide off the hook and in which said hinged member is ineffective as a back for the pilot's seat.

21. In aircraft, a body having a compartment for passengers and a compartment for the pilot, a seat for the pilot in said last named compartment, an element pivoted at a point adjacent to said seat adapted to serve as a back for said seat and as a dividing wall between said compartments, and means for moving said element from a position in which it forms a back for said seat and a dividing wall between said compartments to a position in which the element is ineffective to form either a back for said seat or a dividing wall between the compartments.

22. A safety aircraft comprising a supporting wing structure, a tail assembly and an elongate fuselage of integral indivisible construction supported adjacent its forward end by said wing structure and carrying said tail assembly at its rear end, said fuselage having therewithin, adjacent its forward end and said supporting wing structure, a rearwardly openable compartment for the load to be carried by the craft, the load supporting portion or floor of said compartment being flat and even, longitudinally of the fuselage, and being so disposed with respect to the flight determining surfaces of said supporting wing structure and said tail assembly when set in normal flying position, as to lie exactly parallel to the thus determined normal plane of flight of the craft; a parachute carried by said fuselage and releasable therefrom, and means for connecting said parachute to the load within said compartment; the tail assembly and the entire portion of said fuselage extending rearwardly from said compartment to said tail assembly being disposed so out of line with the rear opening of said compartment that said parachute, when released from the craft while pursuing the normal plane of flight mentioned will, by its said connection with the load, cause the load to be withdrawn along the said flat supporting portion of said compartment in a line parallel to the line of flight without interfering with, or interference from, the fuselage or the tail assembly of the craft.

In testimony whereof I hereunto affix my signature.

SOLOMON L. VAN METER, Jr.